US006781121B1

(12) United States Patent
Davis et al.

(10) Patent No.: US 6,781,121 B1
(45) Date of Patent: Aug. 24, 2004

(54) TIME-OF-FLIGHT MASS SPECTROMETER

(75) Inventors: Stephen Charles Davis, Bollington (GB); Alexander Alekseevich Makarov, Cheadle Hulme (GB); Andrew David Hoffman, Manchester (GB)

(73) Assignee: Thermo Finnigan, LLC, San Jose, CA (US)

( * ) Notice: Subject to any disclaimer, the term of this patent is extended or adjusted under 35 U.S.C. 154(b) by 0 days.

(21) Appl. No.: 09/744,043

(22) PCT Filed: Jul. 13, 1999

(86) PCT No.: PCT/GB99/02244

§ 371 (c)(1),
(2), (4) Date: Mar. 14, 2001

(87) PCT Pub. No.: WO00/04568

PCT Pub. Date: Jan. 27, 2000

(30) Foreign Application Priority Data

Jul. 17, 1998 (GB) ............................................ 9815457

(51) Int. Cl.[7] .......................... B01D 59/44; H01J 49/00

(52) U.S. Cl. ....................... 250/287; 250/281; 250/282; 250/288

(58) Field of Search ................................ 250/281, 282, 250/287, 288, 286

(56) References Cited

U.S. PATENT DOCUMENTS

| | | | | |
|---|---|---|---|---|
| 4,694,168 A | | 9/1987 | Le Beyec et al. | |
| 5,202,563 A | * | 4/1993 | Cotter et al. | 250/287 |
| 5,331,158 A | * | 7/1994 | Dowell | 250/286 |
| 5,464,985 A | * | 11/1995 | Cornish et al. | 250/282 |
| 5,619,034 A | * | 4/1997 | Reed et al. | 250/282 |
| 5,625,184 A | | 4/1997 | Vestal et al. | |
| 5,641,919 A | | 6/1997 | Dahneke | |
| 5,753,909 A | * | 5/1998 | Park et al. | 250/281 |
| 6,037,586 A | * | 3/2000 | Baril | 250/287 |
| 6,040,575 A | * | 3/2000 | Whitehouse et al. | 250/281 |
| 6,107,625 A | * | 8/2000 | Park | 250/281 |

FOREIGN PATENT DOCUMENTS

| | | |
|---|---|---|
| WO | WO 92/21140 | 11/1992 |
| WO | WO 98/21742 | 5/1998 |

OTHER PUBLICATIONS

J.E. Pollard, et al; Time–Resolved Mass and Energy Analysis by Position–Sensitive Time–of–Flight Detection; Mar. 24, 1989; pp. 3171–3180; The Aerospace Corporation; Los Angeles, California, USA.

Robert J. Cotter; Analytical Chemistry; Time–of–Flight Mass Spectrometry for the Structural/Analysis of Biological Molecules; Nov. 1, 1992; pp. 1027–1039; vol. 64; No. 21; American Chemican Society.

* cited by examiner

*Primary Examiner*—John R. Lee
*Assistant Examiner*—Paul M. Gurzo
(74) *Attorney, Agent, or Firm*—Haynes and Boone, LLP

(57) ABSTRACT

A time-of-flight mass spectrometer, for example, a MALDI-TOF spectrometer, measures the characteristics of the charge to mass ratio of ionized particles by measuring the time taken for the particles to travel a pre-determined distance. The spectrometer comprises an accelerator (14) which accelerates the particles along at least two paths, which may be contained in a single beam of charged particles. Two detectors (26 and 30) mark the ends of the paths and are operable to detect the particles travelling therealong. The length of the path leading to the first detector (26) differs from that of the path leading to the second detector (30) to a sufficient extent to enable the difference in detection times of corresponding particles at the two detectors to be used to provide a measurement of said characteristics. Variations in initial velocities and/or ionization times of the particles will have similar effect on the outputs of both detectors so that one detector can, in effect, be used to calibrate or correct the output of the other detector.

27 Claims, 5 Drawing Sheets

TIME-OF-FLIGHT MASS SPECTROMETER

FIELD OF INVENTION

This invention relates to time-of-flight mass spectrometers, in which the mass/charge ratio (m/z) of a number of ions can be deduced from the time taken for the ions to be propelled a given distance by a suitable accelerating field such as an electrostatic field.

BACKGROUND TO THE INVENTION

One example of a time of flight spectrometer is a Matrix Assisted Laser Desorption Ionisation Time of Flight (MALDI-TOF) spectrometer.

Such a spectrometer is commonly used to analyse high molecular weight substances, particularly biochemicals, and uses a short pulse of laser energy to eject and ionise molecules of an analyte from crystals which are held within a matrix formed from small organic molecules absorbent to the incident laser radiation. The matrix resonantly absorbs this radiation which accordingly causes an ablation of a region of the matrix, analyte mixture, and the formation of an expansion jet above the surface within which jet ion/molecule reactions take place. Molecules and ions can be ejected from the matrix with various different kinetic energies.

The ions so created are then accelerated towards a detector, normally by an electrostatic field. The kinetic energy KE, of a particle of mass m travelling at a velocity v is given by the equation:

$$KE = \frac{1}{2}mv^2.$$

Thus, each particle travels with the velocity rated to its mass by equation:

$$v = \sqrt{\frac{2KE}{m}}$$

Accordingly, if a pulse of ions is formed, defining time zero, and travels some distance to the detector, then the lighter the ion the earlier it will arrive at the detector. Consequently, the detector signal as a function of time will represent a m/z spectrum of particles of a given charge.

Time of flight mass spectrometers have two important advantages over other types of mass spectrometer:

1. They have a very high sensitivity because most of the ions produced will be detected at the detector, in contrast to scanning spectrometers in which only ions of a given m/z are focussed on the detector at any one time; and
2. A very large mass range, limited only by the efficiency of the detection of high mass ions, can be achieved by a TOF spectrometer.

However, one of the most important factors which limits the accuracy of mass measurements obtained by a MALDI-TOF spectrometer is the variation in ion extraction times from the region of the source. This is believed to arise from variations, from pulse to pulse of the laser, in the initial velocities of ions and positions at which the ions are formed following the laser pulses.

One way of attempting to reduce the effect of this problem is to use very high extraction fields to accelerate the ions towards the detector. However, this does not remedy the problem itself and mass accuracy and mass resolution is still limited.

It is known to equip a spectrometer with a reflectron to increase the mass resolution of the spectrometer. The reflectron reflects the ions to increase the path lengths from source to detector whilst causing the more energetic ions (of a given m/z) to travel a further distance than the less energetic ions to compensate for the differing ion velocities. The reflectron can therefore position the faster moving ions behind the ions with slower velocities. If this happens, the faster ions will eventually catch up with and overtake the slower moving ions at a temporal focal point of the spectrometer.

In addition, it is known to use delayed extraction techniques, whereby a delay is introduced between the firing of the laser pulse and the application of the accelerating field so that when the field is applied, ions with a higher initial velocity will have drifted further away from the sample plate than those with a lower initial velocity.

The latter ions are thus accelerated to a greater degree than those which originally had a higher energy. The ions with the lower initial velocities will then catch up to and eventually overtake the other ions at another temporal focal point.

There has also been reported a variation on delayed extraction where there is a small retarding field between the sample plate and the first extraction plate during the delay period, prior to application of the extraction pulse. (U.S. Pat. No. 5,625,184).

However, even when these techniques are combined, the variations in initial kinetic energies can still significantly reduce the mass accuracy of the spectrometer. Mass accuracy is also affected by variations in power supply voltages (from which the accelerating voltages are derived), temperature drift and other factors which may influence flight times of ions to the detector.

A known way of further improving the mass accuracy of the spectrometer is to use internal standards. An internal standard is a known compound (or number of compounds) which is mixed with the sample to be analysed and is ionised with the analyte. It is believed that the same variations in initial conditions will be experienced by both the known compound(s) and the analyte, so that the internal standard can then be used to recalibrate the mass spectrum obtained from the detector. However, it can be difficult to cause the internal standard to co-crystallise uniformly with the compounds being analysed.

SUMMARY OF THE INVENTION

According to the invention, there is provided a time of flight mass spectrometer for measuring characteristics of the m/z ionised particles, the spectrometer comprising acceleration means for accelerating the particles along at least two paths and two detectors which are situated one in each respective path and are operable to detect particles travelling therealong, wherein the length of the path leading to the first detector differs from that of the path leading to the second detector to a sufficient extent to enable the difference in the detection times of corresponding particles at the two detectors to be used to provide a measurement of said characteristics.

It will be appreciated that, for the purposes of this specification, the characteristics to be measured, may for example, comprise charge to mass ratio or its reciprocal.

Variations in the initial velocities or ionisation times of the particles will affect the outputs of both detectors. However, these variations will have a similar effect on the detector outputs so that one detector can, in effect, be used to calibrate or correct the output of the other detector. Similarly, variations of any other parameters such as accelerating voltages will affect the outputs of both detectors.

Typically, the output of each detector will have one or more peaks. Consequently, the analysis of the detector outputs could involve identifying corresponding peaks in the detector outputs, and calculating the difference in their respective times of occurrence.

Preferably, the spectrometer includes temporal focusing means for at least partially compensating for any spread in the initial kinetic energies of particles of a given m/z so as to provide two temporal focal points, wherein each detector is situated at a respective temporal focal point. The focusing means can function in one or more of a number of ways. For example, particles with higher kinetic energies can be caused to travel along longer paths than those with lower kinetic energies, and/or can be accelerated to a lesser extent than the slower particles.

Preferably, the spectrometer is operable to create a beam of said particles, said beam containing both of said paths.

In this case, the focusing means may to advantage comprise reflection means for reflecting the particles in the beam in such a way that the higher the kinetic energy of particles of a given charges and mass, the longer the path of those particles through the reflection means, the reflection means being situated in the path of the beam between the two detectors.

Preferably, the focusing means comprises further reflection means positioned in the path of the beam between the sample and first of the detectors so that the beam is of a generally serpentine shape.

The spectrometer conveniently includes a laser for releasing said ionised particles from the sample. Alternatively, the spectrometer may use other means to create ions, for example electrospray ionisation, electron impact ionisation, chemical ionisation, elevated pressure MALDI etc.

The focusing means may further comprise delay means for delaying the operation of the acceleration means for a set time after the operation of the laser, the acceleration means being so arranged that the further a particle has travelled from the sample before the acceleration means is activated, the lower the acceleration of the particle.

Preferably, the spectrometer includes data processing means which is connected to both detectors and is operable to identify corresponding portions of the detector outputs, and measure the difference between the times at which said portions occurred.

Preferably, said portions comprise peaks in the outputs of the detectors.

Preferably, the spectrometer is a MALDI-TOF spectrometer, although the principle may be applied to other types of mass spectrometers, for example orthogonal extraction TOF mass spectrometers, quadrupole-TOF or sector-TOF mass spectrometers. The principle is applicable to both ion counting and analogue detection systems.

Preferably, the spectrometer includes trapping means for temporarily trapping particles released from the source in a zone adjacent the sample prior to the acceleration of the particles.

The trapping means helps to compensate for variations in particle extraction times from a sample.

Preferably, the trapping means includes means for injecting a gas into that zone to interact with the particles.

The trapping means is an example of ion transport means between the ion source and acceleration region. In other embodiments of the dual detector principle described herein the ion source region may be separated by other forms of ion transport means. The ion transport means may comprise for example a differentially pumped interface or any number of prior stages of mass spectrometric analysis.

BRIEF DESCRIPTION OF THE DRAWINGS

The invention will now be described, by way of example only, with reference to the accompanying drawings in which.

DETAILED DESCRIPTION

Figure 1:
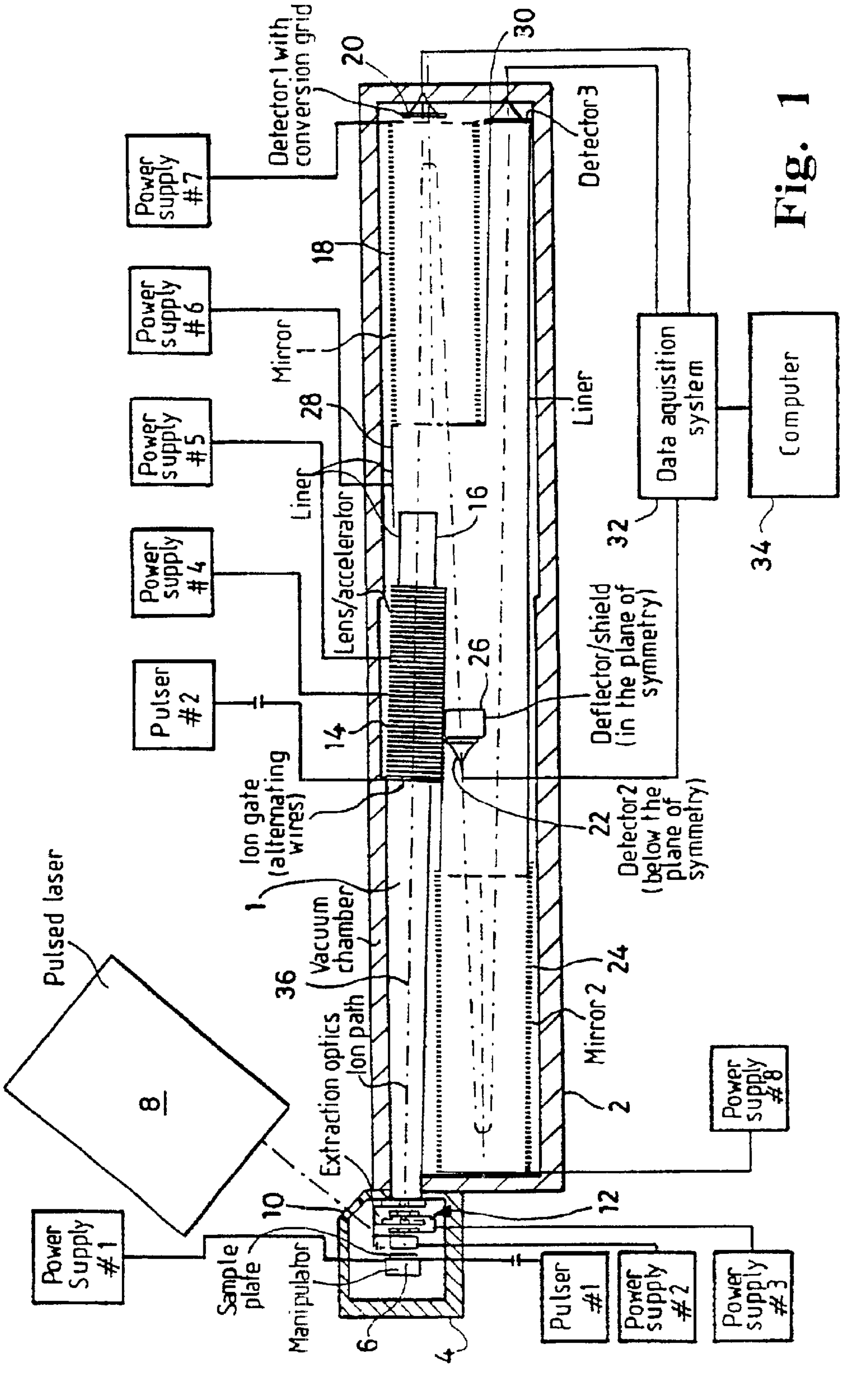
FIG. 1 is a diagrammatic sectional side view of a MALDI-TOF mass spectrometer in accordance with the invention.

The spectrometer shown in FIG. 1 has a housing 2 which defines a vacuum chamber 1 and includes an end portion 4 having a sample lock which contains a sample plate 6 for holding a sample to be analysed. The sample lock includes a sealable door (not shown) to provide access to the plate 6 from outside the housing 2, the sample lock includes a further door for sealing the lock from the rest of the chamber 1 so that a sample can be placed on or removed from the plate 6 without having to pressurise the chamber 1.

A pulse laser 8 is situated outside the housing 2 in a position in which light from the laser 8 passes through a window 10 in the housing 2 and onto the sample plate 6. A succession of annular electrodes 12 is interposed between the sample plate 6 and the main body of the housing 2, the central apertures of the electrodes 12 being in alignment with each other so that ions emitted from the sample 6 can pass along a path through the apertures in the electrodes 12 into the main body of the housing 2. That path extends through an annular lens and accelerator unit 14.

The lens/accelerator unit functions as a lens in normal operation to provide some focusing of the beam in order to improve transmission through the instrument. The lens/accelerator unit is situated after an ion gate. The ion gate in this embodiment consists of wires which can carry voltages of alternating polarity to deflect the ion beam away from the normal path so it does not reach the detectors. If voltages to the gate are switched off at a particular instant in time when ions of a particular m/z ratio arrive at the gate, they will be transmitted through the instrument. The gate is used in the post source decay (PSD) mode of the instrument. PSD refers to the fragmentation of ions after they have been extracted from the ion source. PSD fragment ions have different kinetic energies from the parent ion from which they are derived but travel with nearly the same velocity. Thus, each m/z parent ion and its PSD fragment ions will arrive at the ion gate at essentially the same time and can be gated into the instrument while all other m/z parent ions are rejected.

An ion once selected by the ion gate can be distinguished from its PSD fragments by subjecting all the ions to electric fields. IN PSD mode, the lens accelerator unit functions as an accelerator to accelerate all the ions to high energy. This means the relative energy difference between the PSD fragment ions is reduced to increase the mass resolution of the recorded mass spectrum. The chamber has an inner skin in the form of a conductive liner 28, which can be floated to voltages different to that of the vacuum chamber wall. In PSD mode of operation the liner is floated to high voltages (negative in the case of positive ions) in order to maintain the high energy of the ions after acceleration by the lens/accelerator unit.

The lens and accelerator unit 14 is carried by a cylindrical liner 16, the axis of which is directed to a reflection means comprising first reflectron 18. The reflectron 18 takes a form of a cylinder defined by a succession of alternating annular electrode plates and annular insulating spacers. The plates are connected to a voltage supply (not shown) which applies a respective voltage to each electrode plate. The voltages applied to the plates are of the same polarity as the charge on the ions to be analysed by the spectrometer, and progressively increase so that the magnitude of the applied voltage at the end of the reflectron 18 closer to the lens and accelerator unit 14 is lower than the magnitude of the voltage applied to the electrode plate at the opposite end of the reflectron 18.

Just beyond that end of the reflectron 18 there is situated a micro channel plate detector 20, which allows the spectrometer to be used for a linear mode of analysis (when the reflectron 18 is not active). A further similar detector 22 is positioned adjacent the lens/accelerator 14 and between the reflectron 18 and a further, identical reflectron 24.

It is possible to add an ion gate between the two reflectrons to select parent ions for subsequent fragmentation before entry to the second reflectron. The two halves of the instrument i.e. from the source to the detector and from the first detector to the second detector can then be used as separate TOF mass spectrometers to perform tandem mass spectrometry (MS/MS). In this case additional liners and ion optics can be added as appropriate.

Figure 2:
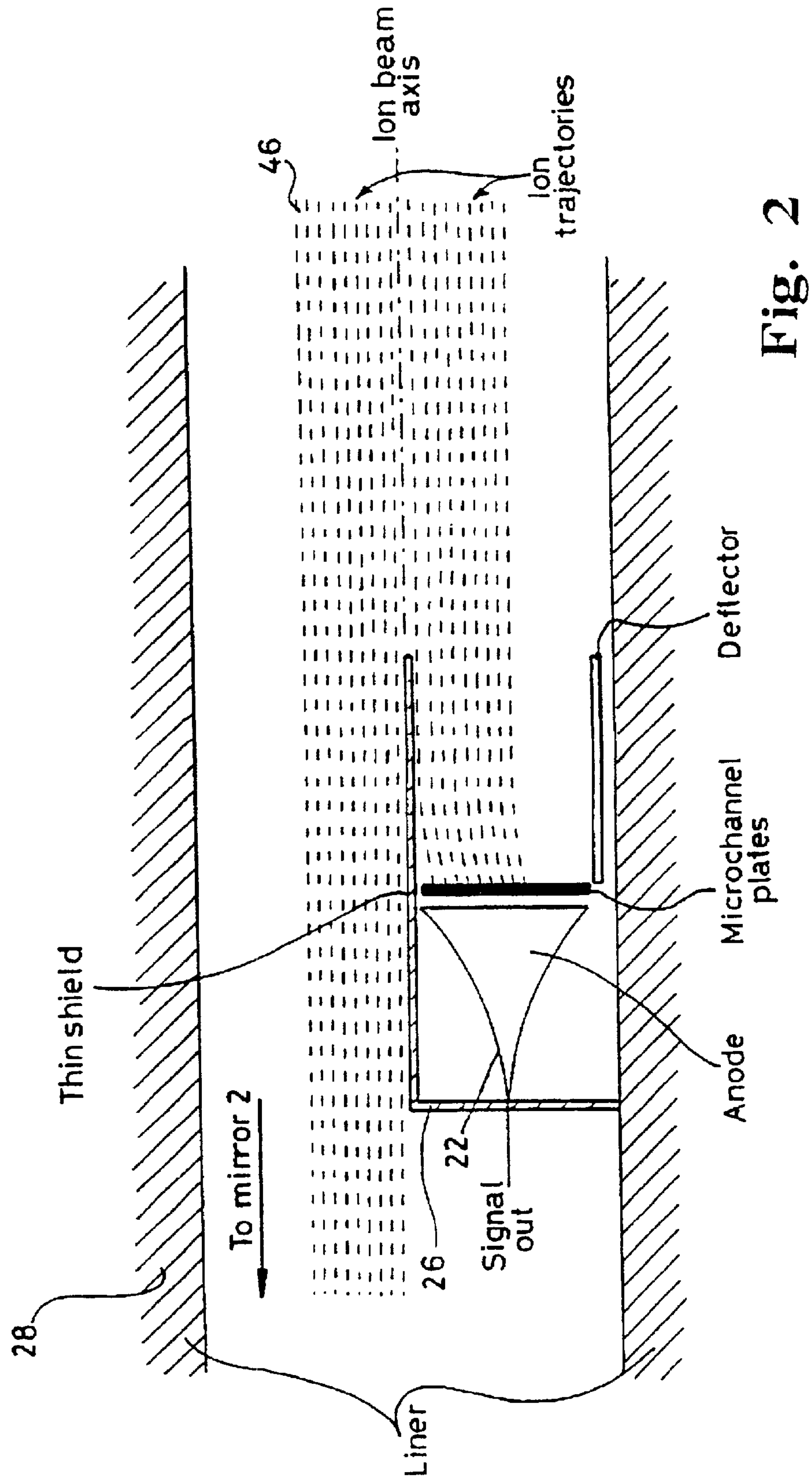
FIG. 2 is a more detailed sectional side view of a detector for the spectrometer.

The detector 22 is connected to a thin conducting shield 26. Both the detector 22 and shield 26 are shown in more detail in FIG. 2, from which it can be seen that the detector and shield are mounted on a cylindrical liner 28 in the path, which in use, is taken by some of the ions to be analysed by the spectrometer. It can be seen from FIG. 2 that the detector 22 captures those ions, while allowing the remaining ions to continue towards the reflectron 24, the shield preventing the detector 22 from influencing the trajectories of those ions.

A third detector 30, identical to the detectors 22 and 20 is positioned at the end of the housing 2 opposite the reflectron 24, in such a way as to capture ions reflected by the latter. The output of the detectors 20, 22 and 30 are connected via a data acquisition system 32 to a computer 34.

In use, a substance to be analysed, having been incorporated into a suitable matrix, is placed on the sample plate 6. The door to the sample lock 4 is then closed.

The laser 8 then fires a pulse of ultra violet light of a wave length of 337 nm through the window 10 and onto the sample on the plate 6. The matrix resonantly absorbs the laser light which consequently causes a jet of material, which contains of the analyte to erupt from a region of the sample.

The molecules of analyte contained in the jet travel away from the sample at differing speeds, and are ionised at various different times after the occurrence of the pulse.

After a predetermined delay, an accelerating electrostatic field is applied to the jet by applying a voltage to the electrodes 12. When this happens, the ions which were ejected at high velocities will have drifted further away from the sample plate 6 and closer to the electrodes 12 than those ions of the jet which have lower velocities.

The further the ions are from the electrodes 12 when the field is applied, the greater their acceleration. The electrodes 12 create a beam in which, as a result, the ions having low initial velocities (ie before the extraction field is applied) are travelling at higher velocities than the ions with the high initial velocities, and therefore eventually catch up with and overtake the latter ions at a first temporal focal point. It is also possible to have a time varying electric field near the sample plate prior to application of the extraction pulse to further correct for the velocity speed.

In FIG. 1, the path taken by the beam of ions is indicated by reference numeral 36, from which it can be seen that the beam travels through the lens and accelerator unit 14 and on to the first reflectron 18, the function of which will now be described. The mass resolution of a signal obtained from a detector in a time of flight spectrometer is given by the formula:

$$R = \frac{T}{2\Delta T}$$

Where T is the total flight time to the centre of the detected peak, and ΔT the duration of the detected peak. Resolution can therefore be increased by increasing T and/or decreasing ΔT.

Increasing T is achieved by increasing the flight paths length. However, simply doubling the length of the flight path does not necessarily double resolution since ΔT also tends to increase with increasing path lengths, due to the energy (and hence velocity) spread of the ions in the beam.

The reflectron 18 increases the resolution of the spectrometer by increasing flight length, but maintaining ΔT at very nearly the same value as existed after extraction from the sample. Ions passing into the reflectron 18 are subjected to an electric field, the intensity of which progressively increases as the ions travel towards the detector 20. It will be appreciated that the higher the initial kinetic energy of an ion, the further into the reflectron 18 it will travel before stopping and being accelerated back out of the reflectron by the electric field.

Figure 3:
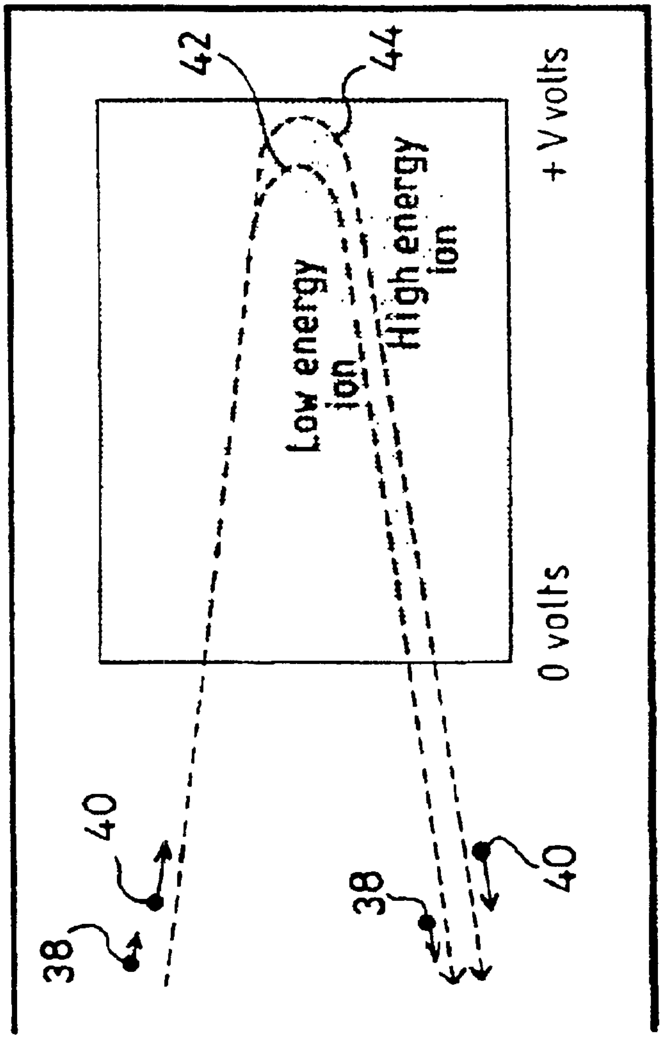
FIG. 3 is a diagram showing the paths of two ions through a reflector of the spectrometer.

This is effect is illustrated in FIG. 3, in which reference numeral 38 indicates an ion travelling into the reflectron 18 at a relatively low velocity and the reference numeral 40 indicates an ion travelling at a higher velocity. Although the lower velocity ion 38 reaches the reflectron 18 after the higher velocity ion, it follows a shorter path to the reflector, indicated by reference number 42, and thus exits the reflectron 18 before the ion 40 (which has followed the longer path 44).

The ion 40 is still travelling at a higher velocity than the ion 38 and will therefore eventually catch up to and overtake the latter at a temporal focal point in the spectrometer. The detector 22 is positioned at that focal point, and projects half way into the beam (indicated in FIG. 2 by reference numeral 46) to intercept the ion below the axis of that beam. Other means of selecting a portion of the beam for detection on detector 22 such as a multi-element deflector will also be possible.

Figure 4:
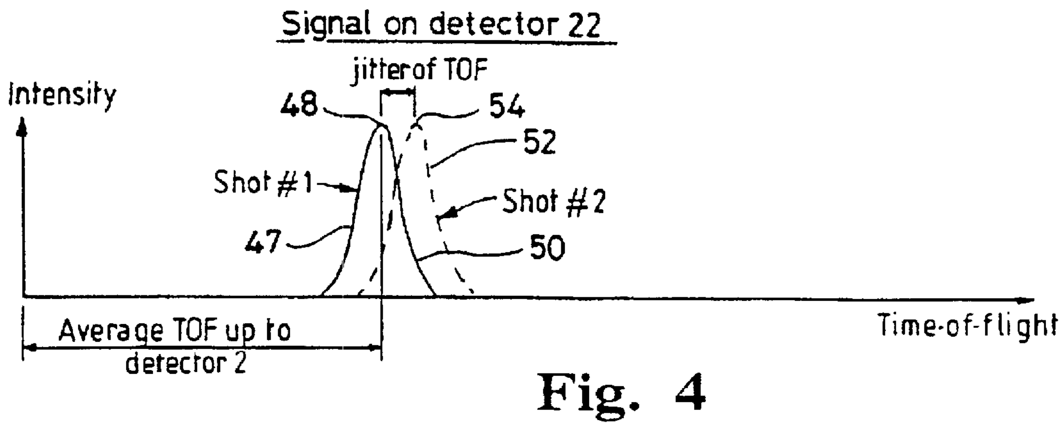
FIGS. 4 and 5 are simplified representations of signals which are obtained from two detectors of the spectrometer.

In the graph shown in FIG. 4, the horizontal axis indicates the time from the firing of a delayed extraction voltage pulse applied to the electrodes 12 to accelerate the ions, the origin being the time at which the pulse was fired, whilst the vertical axis indicates the magnitude of the signal produced by the detector, and hence the number of ions detected.

Figure 5:
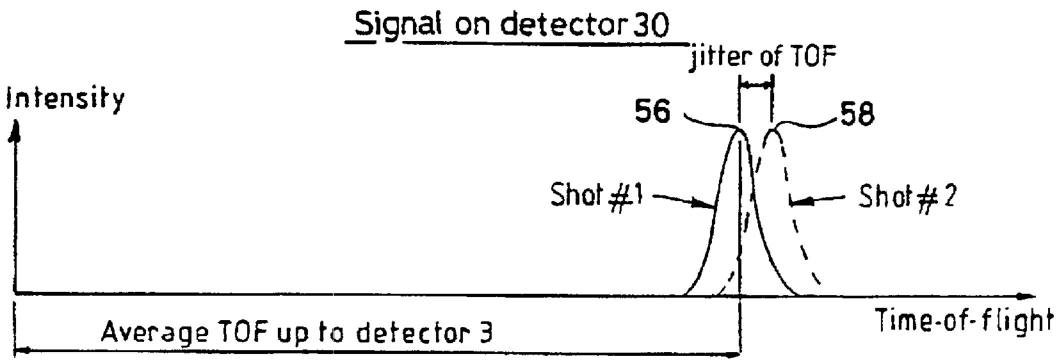

The ions which are not counted by the detector 22 travel in a beam into the reflectron 24 which performs a similar function to the reflectron 18, reducing the spatial spread of ions (of the same mass to charge ratio) of different velocities and directing the beam towards a second temporal focal point at which the detector 30 is situated. FIGS. 4 and 5 are simplified graphs illustrating the signals which would be produced by the detectors 22 and 30 if all the ions in the beam have the same charge to mass ratio. If all the ions were released simultaneously from the same position on the sample with the same initial velocity, the signal produced by the detector 22 would be a simple peak of an infinitesimal width.

However, due to the variation of initial kinetic energies of the ions and of ion extraction times, the signal produced by detector 22 will comprise a gradual ascent 47 to a maximum 48 which is followed by a gradual descent 50. The ascent, maximum and descent of a signal are commonly referred to as a peak, which can therefore have a finite width.

The broken line trace 52 indicates the signal which might be generated by ions released from the sample by a second laser pulse. It can be seen that the signal produced from pulse to pulse may shift due to different ejection characteristics of the sample.

The maximum portion of this signal, denoted by the reference numeral 54, is displaced in time relative to the peak 48 because the second laser pulse imparted, on average, lower kinetic energies to the ions than did the first pulse.

However, as is shown in the graph of FIG. 5, the axes of which correspond to those of FIG. 4, this displacement is also present in the signals produced by the detector 30, in which peaks 56 and 58 correspond to peaks 48 and 54 respectively.

Figure 6:
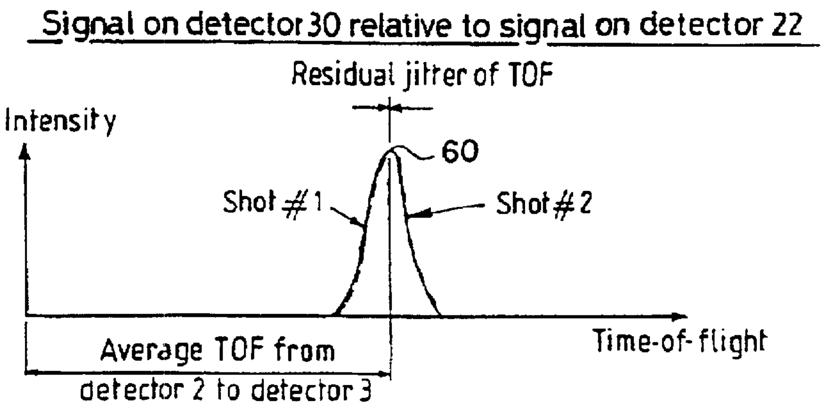
FIG. 6 shows a signal derived from the signals from the detectors.

The computer 34 is programmed to identify the peaks from the outputs of the individual detectors and to correlate the maxima 48 and 56 and 54 and 58. The computer then creates the graph shown in FIG. 6, in which the horizontal axis indicates the time delay between corresponding portions of signals produced by detectors 22 and 30. Consequently, the displacement between the peaks in the signal from the detector 22 is cancelled out by the corresponding displacement in the signals from the detector 30, to give substantially the same peak position 60 for both laser pulses.

The corresponding peaks on detectors 22 and 30 can be determined from the calibrations of the two detectors. Once this has been done the peaks can be correlated in a point by point fashion in order to plot the new peak(s) generated from the time difference between each correlated point.

The peaks on the first detector (detector 22) are correlated with the peaks on the second detector (detector 30) using an appropriate correlation function, so that each time bin across the peaks of the detector 30 can then be correlated with a time bin across the peaks on the detector 22. The flight times at each of the points across the peak on detector 22 are then subtracted from the flight time of the corresponding points on detector 30. The flight time differences are then plotted on a new time graph which is representative of the flight times between the two detectors. Since the peak widths of the peaks on the two detectors in the described embodiment should be similar, the plotted peaks in the differential spectrum will be much narrower.

Alternatively the centroid(s) of the peak(s) on detectors 22 and 30 may be calculated and the time difference between the centroids used as the centroid of the peak in the differential spectrum.

The process may be repeated for each successive pulse, and the individual pulses are accumulated in the differential spectrum. Alternatively a number of pulses may be accumulated and/or averaged before any mathematical procedure is used to determine the differential spectrum. Since the jitter in arrival times at the two detectors will be in the same direction, the time position in the differential mass spectrum will be relatively invariant and peak widths should remain narrow. Narrow peaks mean the accuracy of the m/z values assigned to the peaks will be high.

The differential mass spectrum is used for determining the m/z values to high accuracy. It will not however reflect the true mass resolution of the mass spectrometer. The true mass resolution of the instrument will be evident from individual shots on detector 30. The individual shots on detector 22 can also be accumulated and aligned on the basis of the jitter determined from the differential measurements.

In reality, the sample may produce ions of differing charge to mass ratios, so that the detectors 22 and 30 produce signals each of which has a series of peaks. However, the spectrometer can be calibrated to a reasonably high degree of accuracy so that it would be possible to ascertain which peaks corresponds to the same mass/charge ratio on the two detectors.

Figure 7:
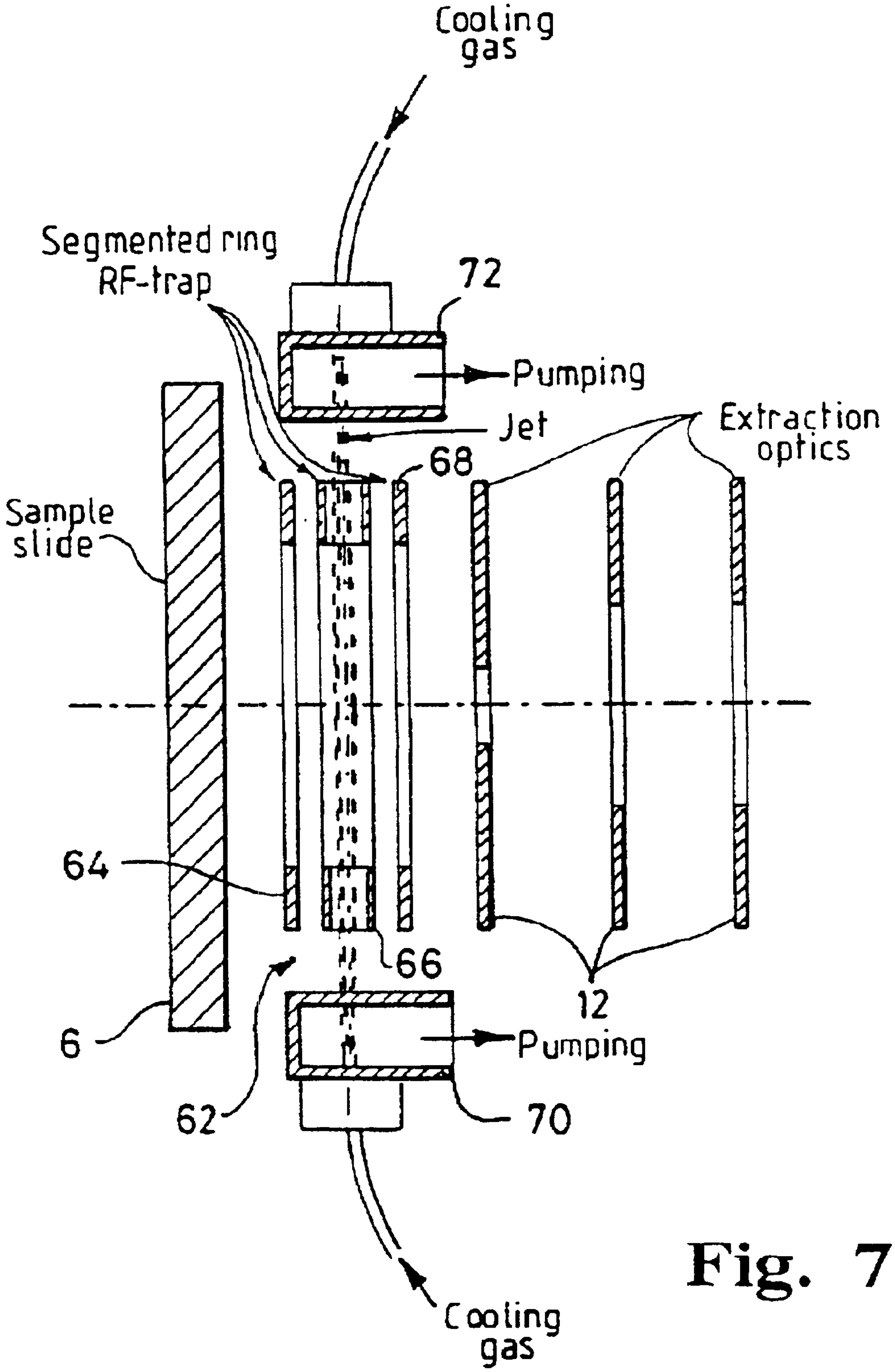
FIG. 7 is a sectional side view of part of a modified version of the spectrometer.

FIG. 7 shows a part modified version of the spectrometer identical to the spectrometer shown in FIG. 1, apart from the inclusion of a trapping means comprising a trapping cell 62 interposed between the sample plate 6 and the annular electrode 12.

The object of the cell 62 is to provide high mass accuracy by accounting for variations in flight times due for example to variations in voltages, ejection velocities etc. In the case of MALDI-TOF it is desirable to have uniform sample preparation and good control over laser power to achieve the best mass resolution. Variations in these parameters are compensated for to some extent by delayed extraction. However, it would be an advantage to be able to de-couple the ion source extraction times from the timing of the TOF mass spectrometer.

The preferred embodiment of trapping cell is a cylindrically symmetric trapping cell 62 positioned after the sample plate 6. Ions are extracted from the source and injected into the trap 62 where they are contained within a confined region of space by radio frequency fields created by applying suitable voltages to three annular electrodes 64, 66 and 68. A pulse of gas is then introduced into the cell via a pulsed valve to form a jet from two opposing sides. The cell region defined by the electrode 66 is pumped via ports 70 and 72 connected to a vacuum source, remains under high vacuum.

The ions in the trap 62 undergo multiple low energy collisions with the background gas and migrate to the centre of the trap during the time period the high pressure exists. The ions are then ejected from the trap into the mass spectrometer as before by applying a voltage pulse to the electrodes 12. The pulse initiates the start of time for the TOF mass spectrometer. It is also possible to use such a device with a continuous beam ion source such as electrospray, where the trap is filled for a period of time before cooling and ejection into the mass spectrometer. Any other construction of trap, for example quadrupole ion trap could be used.

It will be appreciated that various modifications may be made to the spectrometer without departing from the scope of the invention. Thus, for example, the spectrometer could have just one reflectron. In addition, the spectrometer may use alternative types of detector, for example channeltrons or dynode electron multipliers or image current detection.

What is claimed is:

1. A time of flight mass spectrometer for measuring the m/z of ionized particles, the spectrometer comprising:

an ion source for generation of said ionized particles, acceleration means for acceleration of said ionized particles so as to form an ion beam, means for sampling from the ion beam such that a share of the beam is detected on each of two detectors such that the time of flights for any or all ions of a given m/z to each of the two detectors is used for the purpose of improving the accuracy of measurement of the m/z values of ions, wherein one of the two detectors is positioned so as to intercept at least a first portion of the ionized particles and to permit a second portion of the ionized particles to continue past the detector, and a data processor adapted for calculating differences or average differences in arrival times of corresponding particles at each of said two detectors to enable said m/z characteristics to be determined.

2. A spectrometer according to claim 1, in which the spectrometer includes temporal focusing means for at least partially compensating for any spread in the initial kinetic energies of particles of a given m/z so as to provide two temporal focal points, wherein each detector is situated at a respective temporal focal point.

3. A spectrometer according to claim 1, wherein the spectrometer includes interfacing means for transporting, or allowing the transport of ions from a sample to the acceleration means.

4. A spectrometer according to claim 3, in which the interacting means comprising trapping means for temporarily trapping particles released from the source in a zone adjacent the sample prior to the acceleration of the particles.

5. A spectrometer according to claim 1 wherein the direction of the ion beam at the entry to the acceleration means is inclined at any angle to the direction of acceleration.

6. A spectrometer according to claim 1, in which the focusing means comprises reflection means for reflecting the particles in the beam in such a way that the higher the kinetic energy of particles of a given charges and mass, the longer the path of those particles through the reflection means, the reflection means being situated in the path of the beam between the two detectors.

7. A spectrometer according to claim 6, in which the focusing means comprises further reflection means positioned in the path of the beam between the sample and first of the detectors so that the beam is of a generally serpentine shape.

8. A spectrometer according to claim 1, in which the spectrometer includes a laser for releasing said ionized particles from the sample or any other ion source used in mass spectrometry.

9. A spectrometer according to claim 1, in which the focusing means further comprises delay means for delaying the operation of the acceleration means for a set time after the release of said ionized particles.

10. A spectrometer according to claim 9, in which said portions comprise peaks in the outputs of the detectors.

11. A spectrometer according to claim 1, in which the spectrometer includes data processing means is connected to both detectors and is operable to identify corresponding portions of the detector outputs, and measure the difference between the times at which said portions occurred.

12. A spectrometer according to claim 1, in which the spectrometer is a MALDI-TOF spectrometer.

13. A spectrometer according to claim 12, in which the trapping means includes means for injecting a gas into that zone to interact with the particles.

14. A method of time of flight spectrometry for measuring characteristics of the m/z of ionized particles, the method comprising:

releasing said ionized particles from a sample, accelerating said particles along two paths;

measuring the times of arrival of the particles at first and second points associated with first and second detectors, respectively, one on each respective path, at differing distances from said sample, wherein the measuring includes intercepting at least a first portion of the particles on one path at a focal point and permitting a second portion of the particles to continue past the focal point; and measuring the differences or average differences in arrival times of corresponding particles at said points to enable said m/z characteristics to be determined.

15. A method according to claim 14, in which the beam is of a generally serpentine shape.

16. A method of time of flight spectrometry for measuring characteristics of the m/z of ionized particles, the method comprising:

releasing said ionized particles from a sample;

accelerating said particles along two paths, in which both of said paths are contained in a single particle beam, with one path running alongside, but stopping short of, the other;

measuring the times of arrival of the particles at first and second points, one on each respective path, at differing distances from said sample, wherein the first point and the second point are associated with a first detector and a second detector, respectively; and measuring the differences or average differences in arrival times of corresponding particles at said points to enable said m/z characteristics to be determined.

17. A time of flight mass spectrometer for measuring the m/z of ionized particles, the spectrometer comprising:

an ion source for generating the ionized particles;

an accelerator for accelerating the ionized particles to form an ion beam;

first and second detectors for detecting at least some of the ionized particles from the ion beam; and a first reflectron for reflecting at least some of the ionized particles towards the second detector, wherein the first reflectron is disposed between the first and second detectors, and wherein the second detector is positioned so as to intercept at least a first portion of the reflected ionized particles and to permit a second portion of the reflected ionized particles to pass; and a data processor adapted for calculating a differences or average differences in arrival times of corresponding particles at said first and second detectors to enable said m/z characteristics to be determined.

18. The spectrometer of claim 17 wherein the second detector is positioned at a focal point where a first ionized particle overtakes a second ionized particle of lower velocity.

19. The spectrometer of claim 18 wherein the second detector is a multi-element detector.

20. The spectrometer of claim 17 further comprising a trapping cell for decoupling an extraction time of at least some of the ionized particles from a timing associated with the spectrometer, wherein the trapping cell is operable to delay the trapped ionized particles before the trapped ionized particles are accelerated.

21. The spectrometer of claim 17 further comprising:

a third detector, and a second reflectron, wherein the second reflectron is disposed between the second and third detectors.

22. The spectrometer of claim 21 further comprising an ion gate positioned between the first and second reflectrons.

23. A method for measuring the m/z of ionized particles using a time of flight spectrometer, the method comprising:

generating the ionized particles;

accelerating the ionized particles to form an ion beam;

reflecting at least some of the ionized particles from the ion beam towards at least one of a first and second detector;

detecting at least some of the ionized particles with the first and second detectors, wherein the detecting includes intercepting at least a first portion of the reflected ionized particles with the second detector and permitting a second portion of the reflected ionized particles to continue past the second detector; and calculating the m/z of at least some of the detected ionized particles using a difference or average difference in the time of flights for any or all ions of a given m/z to each of the two detectors.

24. The method of claim 23 further comprising delaying at least some of the ionized particles before the ionized particles are accelerated.

25. The method of claim 23 further comprising selecting parent ions for fragmentation.

26. A time of flight mass spectrometer for measuring the m/z of ionized particles, the spectrometer comprising:

an ion source for generation of said ionized particles;

an accelerator for acceleration of said ionized particles so as to form an ion beam;

at least two detectors for sampling from the ion beam, such that a share of the ion beam is detected on each of the two detectors; and a data processor adapted for calculating differences or average differences in arrival times of corresponding particles at each of said two detectors to enable said m/z characteristics to be determined.

27. A method for measuring the m/z of ionized particles using a time of flight mass spectrometer, the method comprising:

generating said ionized particles using an ion source;

accelerating said ionized particles so as to form an ion beam; and sampling from the ion beam using at least two detectors, such that a share of the ion beam is detected on each of the two detectors, wherein the difference or average differences in the time of flights for any or all ions of a given m/z to each of the two detectors is used for improving the accuracy of measurement of the m/z values of ions.

* * * * *